US 9,477,122 B2

(12) United States Patent
Koo et al.

(10) Patent No.: US 9,477,122 B2
(45) Date of Patent: Oct. 25, 2016

(54) DISPLAY DEVICE

(71) Applicant: Samsung Display Co., Ltd., Yongin, Gyeonggi-Do (KR)

(72) Inventors: Bon-Yong Koo, Cheonan-si (KR); Dong Yeon Son, Asan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 36 days.

(21) Appl. No.: 14/456,119

(22) Filed: Aug. 11, 2014

(65) Prior Publication Data

US 2015/0205154 A1    Jul. 23, 2015

(30) Foreign Application Priority Data

Jan. 20, 2014   (KR) .................. 10-2014-0006914

(51) Int. Cl.
*G02F 1/1345* (2006.01)
*G09G 3/36* (2006.01)

(52) U.S. Cl.
CPC ......... *G02F 1/1345* (2013.01); *G02F 1/13454* (2013.01); *G09G 3/36* (2013.01)

(58) Field of Classification Search
CPC .................................................. G02F 1/1345
USPC ................. 349/42, 43, 44, 45, 151
See application file for complete search history.

(56) References Cited

U.S. PATENT DOCUMENTS

| | | | |
|---|---|---|---|
| 8,384,699 B2 | 2/2013 | Yamazaki et al. | |
| 2003/0189685 A1* | 10/2003 | Choi | G02F 1/1345 349/149 |
| 2004/0223336 A1* | 11/2004 | Murakami | B60Q 1/2669 362/501 |
| 2004/0233368 A1* | 11/2004 | Kim | G02F 1/13624 349/139 |
| 2006/0049407 A1* | 3/2006 | Jung | H01L 27/12 257/72 |
| 2006/0267914 A1* | 11/2006 | Chang | G02F 1/1345 345/100 |
| 2007/0035675 A1* | 2/2007 | Um | G02F 1/134363 349/43 |
| 2007/0194699 A1* | 8/2007 | Lee | H01L 27/3276 313/505 |
| 2008/0204619 A1* | 8/2008 | Saitou | G02F 1/136204 349/43 |
| 2010/0123868 A1* | 5/2010 | Kim | G02F 1/136286 349/143 |
| 2011/0074748 A1* | 3/2011 | Cho | G02F 1/133723 345/205 |
| 2013/0082990 A1* | 4/2013 | Her | G09G 5/00 345/206 |
| 2013/0148050 A1* | 6/2013 | Kwon | G02F 1/136204 349/43 |
| 2014/0043552 A1* | 2/2014 | Chang | G02F 1/13454 349/43 |
| 2014/0152935 A1* | 6/2014 | Heo | G02F 1/1339 349/43 |
| 2014/0176838 A1* | 6/2014 | Hong | G02F 1/134363 349/33 |
| 2015/0144922 A1* | 5/2015 | Moon | H01L 27/3279 257/40 |
| 2015/0219944 A1* | 8/2015 | Mitsumoto | G02F 1/1339 349/138 |

FOREIGN PATENT DOCUMENTS

| | | |
|---|---|---|
| JP | 5247312 B2 | 4/2013 |
| KR | 10-0950228 B1 | 3/2010 |
| KR | 10-1085150 B1 | 11/2011 |
| KR | 1020120128910 A | 11/2012 |
| KR | 1020130026375 A | 3/2013 |
| KR | 1020130075528 A | 7/2013 |

* cited by examiner

*Primary Examiner* — Sang V Nguyen
(74) *Attorney, Agent, or Firm* — Cantor Colburn LLP

(57) ABSTRACT

A display device is provided. A display device according to an exemplary embodiment of the present invention includes a display panel including: a display area where a plurality of pixels are disposed and a peripheral area near the display area; and a gate driver disposed in the peripheral area and including a transistor unit and a common voltage application unit, wherein the common voltage application unit overlaps via a first insulating layer disposed on the transistor unit.

20 Claims, 9 Drawing Sheets

DISPLAY DEVICE

This application claims priority to Korean Patent Application No. 10-2014-0006914 filed on Jan. 20, 2014, and all the benefits accruing therefrom under 35 U.S.C. §119, the entire contents of which are incorporated herein by reference.

BACKGROUND (a) Field

The invention relates to a display device.

(b) Description of the Related Art

In general, a display device includes a plurality of pixels which are an image-displaying unit of the display device and defined in a display panel of the display device, and drivers configured to drive the pixels. The drivers include a data driver applying a data voltage to the pixels, and a gate driver applying a gate signal to the pixels for controlling transfer of the data voltage. The gate driver and/or the data driver are mounted on a printed circuit board ("PCB") in a chip type structure to be connected to the display panel or the driver chip is mounted directly on the display panel.

For a non-high mobility thin film transistor channel in a display panel, a structure in which the gate driver is not configured by a separate chip, but instead is integrated in the display panel, has been developed.

The gate driver includes a shift register including a plurality of stages which are connected dependently, and a plurality of signal lines transferring the driving signal thereto. The plurality of stages includes a plurality of thin film transistors and capacitors. Each of the plurality of stages is connected to one gate line among a plurality of gate lines of the display panel, and the plurality of stages sequentially output the gate signal to each of the gate lines according to a predetermined order.

SUMMARY

In a display device, a display panel includes a display area in which an image is displayed and a non-display area in which an image is not displayed. When a gate driver of the display device is integrated in the display panel (e.g., not a chip type structure), the region occupied by the gate driver is mostly a non-display region of the display panel in which an image is not displayed. Accordingly, as the region occupied by the gate driver is increased, the non-display area of the display panel, particularly, the peripheral area surrounding the display area displaying the image, is increased. As the peripheral area surrounding the display area is increased, a bezel of the display device, representing the planar area of the peripheral area is increased, thereby reducing an overall display area of the display device and reducing a consumer's satisfaction for the display device. Therefore, reducing a size of the bezel of the display device is desired.

One or more exemplary embodiment of the invention provides a display device with a reduced area occupied by the gate driver.

An exemplary embodiment of a display device according to the invention includes: a display panel including a display area in which a pixel is disposed and a peripheral area adjacent to the display area; and a gate driver in the peripheral area. The gate driver includes a transistor unit, and a common voltage application unit which provides a common voltage. The common voltage application unit overlaps the transistor unit via a first insulating layer therebetween.

A common electrode in the display area may be further included, and the common electrode and the common voltage application unit may be connected to each other.

The common electrode and the common voltage application unit may be directly connected to each other.

The common electrode and the common voltage application unit may include different materials.

An edge of the common voltage application unit may overlap the common electrode.

A contact assistant on the first insulating layer may be further included, and an opening may be defined in the common voltage application unit and expose the contact assistant.

The pixel may include a switching element, a pixel electrode connected to the switching element, and a common electrode which transmits the common voltage, the pixel electrode and the common electrode may be on the first insulating layer, and the pixel electrode and the common electrode may overlap each other via a second insulating layer therebetween.

The transistor unit may include two transistors, each transistor may include a gate electrode, a source electrode and a drain electrode, and the drain electrode may be connected to a contact assistant disposed on the second insulating layer.

A first contact hole may be defined in the first insulating layer and expose the drain electrode, and the drain electrode may be connected to the contact assistant through the first contact hole.

A gate line which transmits a gate signal to the pixel may be further included, a second contact hole may be defined in the first insulating layer and expose an end of the gate line, and the contact assistant may be connected to the end of the gate line through the second contact hole.

The common electrode may include a metal material, and the common voltage application unit may include a transparent conductive material.

The first insulating layer may include an organic material.

According to one or more exemplary embodiment of the invention, by disposing the common electrode application unit overlapping the transistor circuit unit of the peripheral area, a line width of the common electrode application unit may be expanded.

Also, by forming the insulating layer between the common electrode application unit and the transistor circuit unit, the parasitic capacitance therebetween may be reduced.

BRIEF DESCRIPTION OF THE DRAWINGS

The above and other features of the invention will become more apparent by describing in further detail exemplary embodiments thereof with reference to the accompanying drawings in which.

DETAILED DESCRIPTION

Figure 1:
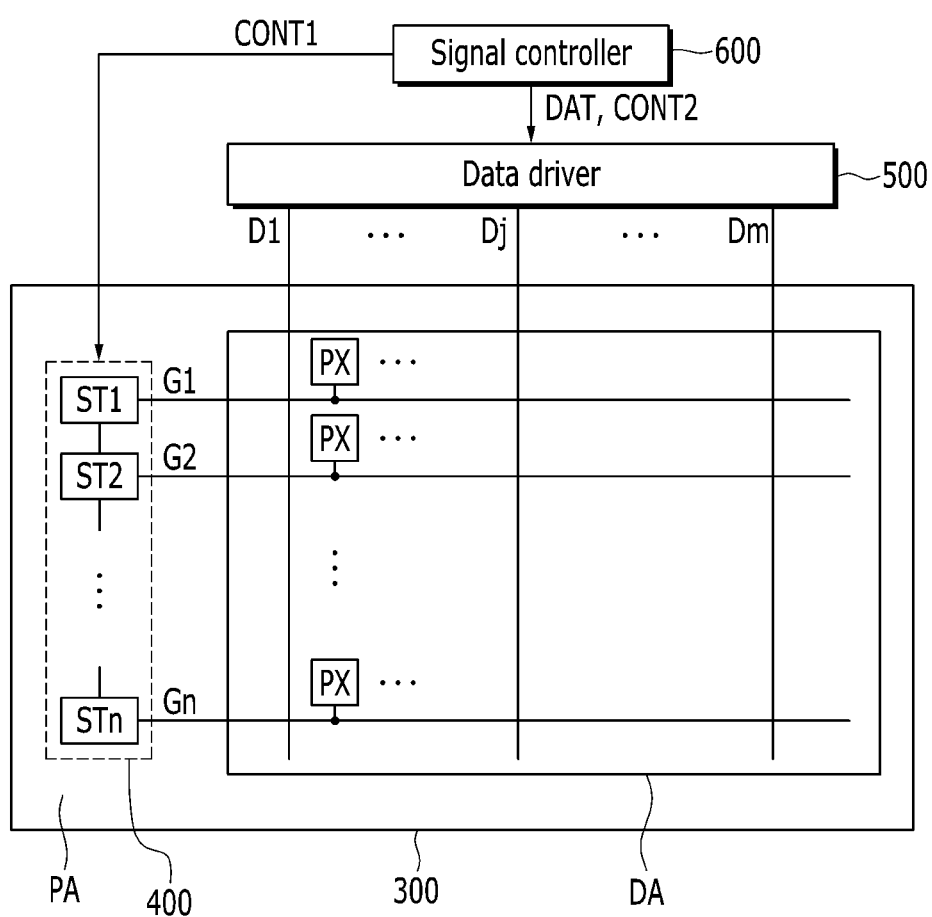
FIG. 1 is a block diagram of an exemplary embodiment of a display device according to the invention.

Hereinafter, exemplary embodiments of the invention will be described in detail with reference to the accompanying drawings. As those skilled in the art would realize, the described exemplary embodiments may be modified in various different ways, all without departing from the spirit or scope of the invention. On the contrary, exemplary embodiments introduced herein are provided to make disclosed contents thorough and complete, and to sufficiently transfer the spirit of the invention to those skilled in the art.

In the drawings, the thickness of layers, films, panels, regions, etc., are exaggerated for clarity. It will be understood that when a layer is referred to as being "on" another layer or substrate, it can be directly on the other layer or substrate, or intervening elements may also be present. Like reference numerals designate like elements throughout the specification. As used herein, connected may refer to elements being physically and/or electrically connected to each other. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "under" relative to other elements or features would then be oriented "above" relative to the other elements or features. Thus, the exemplary term "under" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be described in detail with reference to the accompanying drawings.

Firstly, an exemplary embodiment of a display device according to the invention will be described with reference to FIG. 1 and FIG. 2.

Figure 2:
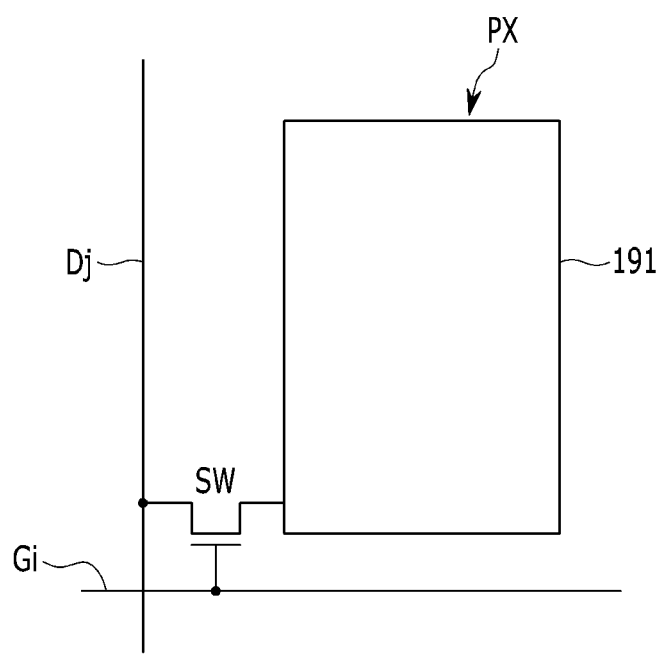
FIG. 2 is a schematic circuit diagram of an exemplary embodiment of one pixel of a display device according to the invention.

FIG. 1 is a block diagram of an exemplary embodiment of a display device according to the invention, and FIG. 2 is a schematic circuit diagram of an exemplary embodiment of one pixel of a display device according to the invention.

Referring to FIG. 1, a display device includes a display panel 300, a gate driver 400, a data driver 500 and a signal controller 600.

The display panel 300 may be a display panel which is included in various display devices, such as a liquid crystal display ("LCD"), an organic light emitting display ("OLED"), and an electrowetting display ("EWD").

The display panel 300 includes a display area DA, and a peripheral area PA surrounding the display area DA.

In the display area DA, a plurality of gate lines G1 to Gn, a plurality of data lines D1 to Dm, and a plurality of pixels PXs which are connected to the plurality of gate lines G1 to Gn and the plurality of data lines D1 to Dm are disposed.

The gate lines G1 to Gn may transfer gate signals, and may extend substantially in a row direction and be substantially parallel with each other.

The data lines D1 to Dm may transfer a data voltage, and may extend substantially in a column direction and be substantially parallel with each other.

The plurality of pixels PXs may be substantially arranged in a matrix form.

Referring to FIG. 2, each pixel PX may include at least one switching element SW connected to a corresponding gate line Gi and a corresponding data line Dj, and at least one pixel electrode 191 connected to the switching element SW. The switching element SW may be a three-terminal element such as a thin film transistor that is integrated in the display panel 300. The thin film transistor includes a gate terminal, an input terminal and an output terminal. The switching element SW is turned on or turned off according to a gate signal of the gate line Gi such that a data signal from the data line Dj to the pixel electrode 191 can be transmitted or blocked. The switching element SW may include at least one thin film transistor, and may include more than one thin film transistor. The pixel PX may display a corresponding image according to the data voltage applied to the pixel electrode 191.

Referring to FIG. 1, the peripheral area PA as a portion of a non-display area of the display device where the image is not displayed in the display device, may be covered by a light blocking member. The peripheral area PA may enclose the display area DA in the top plan view and may be disposed at an outer edge of the display panel 300.

A plurality of signal wires (not shown) transmitting driving signals to the gate driver 400 and/or the data driver 500 may be disposed in the peripheral area PA. Also, the gate lines G1-Gn and the data lines D1-Dm of the display area DA may extend into the peripheral area PA from the display area DA.

The signal controller 600 controls a driver such as the data driver 500 and the gate driver 400.

The signal controller 600 receives input image signals and input control signals for controlling the display thereof from an external graphics controller (not shown). The input control signal includes a vertical synchronization signal, a horizontal synchronizing signal, a main clock signal a data enable signal and the like. The signal controller 600 appropriately processes the input image signals based on the input control signal and generates one or more of a digital image signal DAT, a gate control signal CONT1 and a data control signal CONT2. The gate control signal CONT1 includes a scan start signal instructing start of scanning, at least one clock signal controlling an output period of the gate-on voltage, and at least one low voltage. The data control signal CONT2 includes a horizontal synchronization start signal informing a start of transmission of the digital image signal DAT for one row of the pixels PX, a load signal and a data clock signal.

The signal controller 600 may transmit the data control signal CONT2, the gate control signal CONT1, and the digital image signal DAT to the gate driver 400 and the data driver 500.

The data driver 500 is connected to the data lines D1-Dm of the display panel 300. The data driver 500 receives the data control signal CONT2 and a digital image signal DAT from the signal controller 600, and selects a gray voltage corresponding to the digital image signal DAT, to convert the digital image signal DAT into an analog data signal, and then applies such signals to the corresponding data lines D1-Dm.

The data driver 500 may be mounted on the peripheral area PA of the display panel 300 as a plurality of integrated circuit ("IC") chips, may be mounted on a flexible printed circuit film which is attached to the display device in a tape carrier package ("TCP") type structure, or may be mounted on a printed circuit board ("PCB") which is attached to the display device. According to another exemplary embodiment of the invention, the data driver 500 may be integrated in the peripheral area PA of the display panel 300 along with an electrical element such as the thin film transistor of the display area DA, such as in the same process of a method of manufacturing the display device.

The gate driver 400 is connected to the gate lines G1-Gn. The gate driver 400 generates the gate signals including a gate-on voltage and a gate-off voltage according to the gate control signal CONT1 from the signal controller 600, and applies the gate signal to the gate lines G1-Gn. The gate-on voltage is a voltage that is applied to the gate terminal of the thin film transistor of the display area DA to turn on the thin film transistor, and the gate-off voltage is a voltage that is applied to the gate terminal of the thin film transistor to turn off the thin film transistor.

Referring to FIG. 1, the gate driver 400 is integrated in the peripheral area PA of the display panel 300. The gate driver 400 may include a plurality of stages ST1-STn dependently connected to each other and sequentially arranged.

The plurality of stages ST1-STn is dependently connected to each other. The plurality of stages ST1-STn may generate the gate signals and sequentially transmit the gate signals to the gate lines G1-Gn. Each of the stages ST1-STn may include a gate driving circuit connected to a gate line among the gate lines G1-Gn and have a gate output terminal (not shown) outputting the gate signal to the gate line.

The stages ST1-STn of the gate driver 400 may be disposed at the right or left peripheral area PA of the display area DA and arranged in one line in a column direction, in the top plan view of the display device. FIG. 1 is an example in which a plurality of stages ST1-STn are disposed at the peripheral area PA disposed at the left side of the display area DA, however, the invention is not limited thereto. In an exemplary embodiment, the plurality of stages ST1-STn may be disposed at one of the right, the left and a lower peripheral area PA with respect to the display area DA.

According to an exemplary embodiment of the invention, each of the stages ST1-STn may be connected to the output terminal of the previous stage ST1-STn or the next stage ST1-STn. The first stage ST1 without a previous stage may receive the scanning start signal informing the start of one frame. The final stage STn without a next stage may receive another signal instead of being connected to the output terminal of the next stage.

Each of the stages ST1-STn may include a transistor circuit unit including a plurality of thin film transistors integrated in the peripheral area PA of the display panel 300, and a common electrode application unit. The thin film transistor included in the gate driver 400 may be manufactured with the same process as the thin film transistor included in the pixel PX of the display area DA, in a method of manufacturing the display device.

Figure 3:
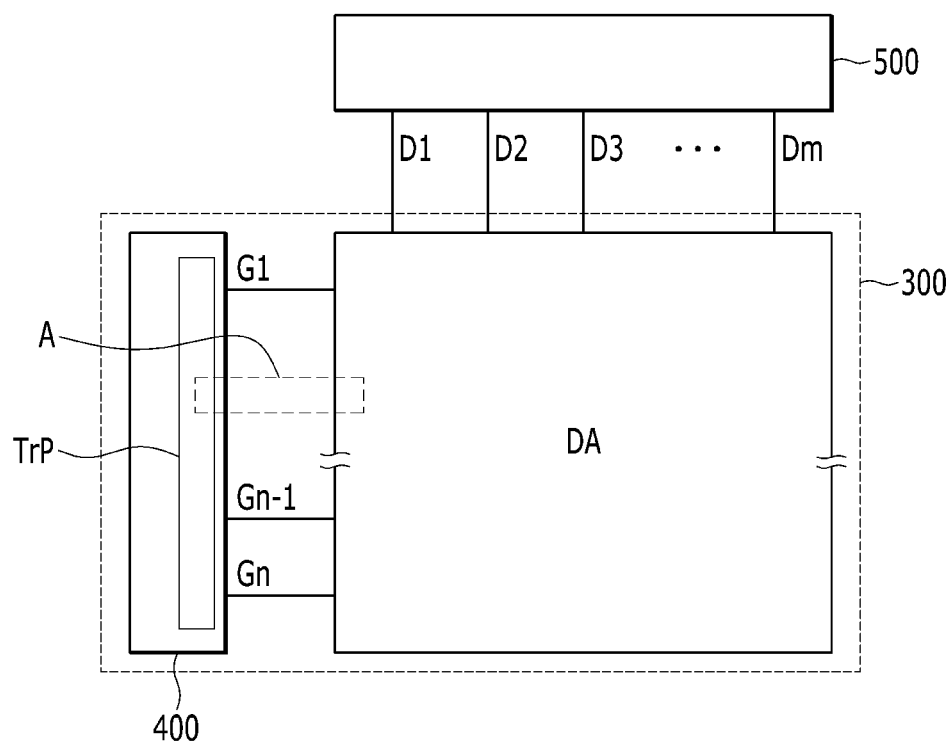
FIG. 3 is a schematic block diagram of an exemplary embodiment of a display device according to the invention.
Figure 4:
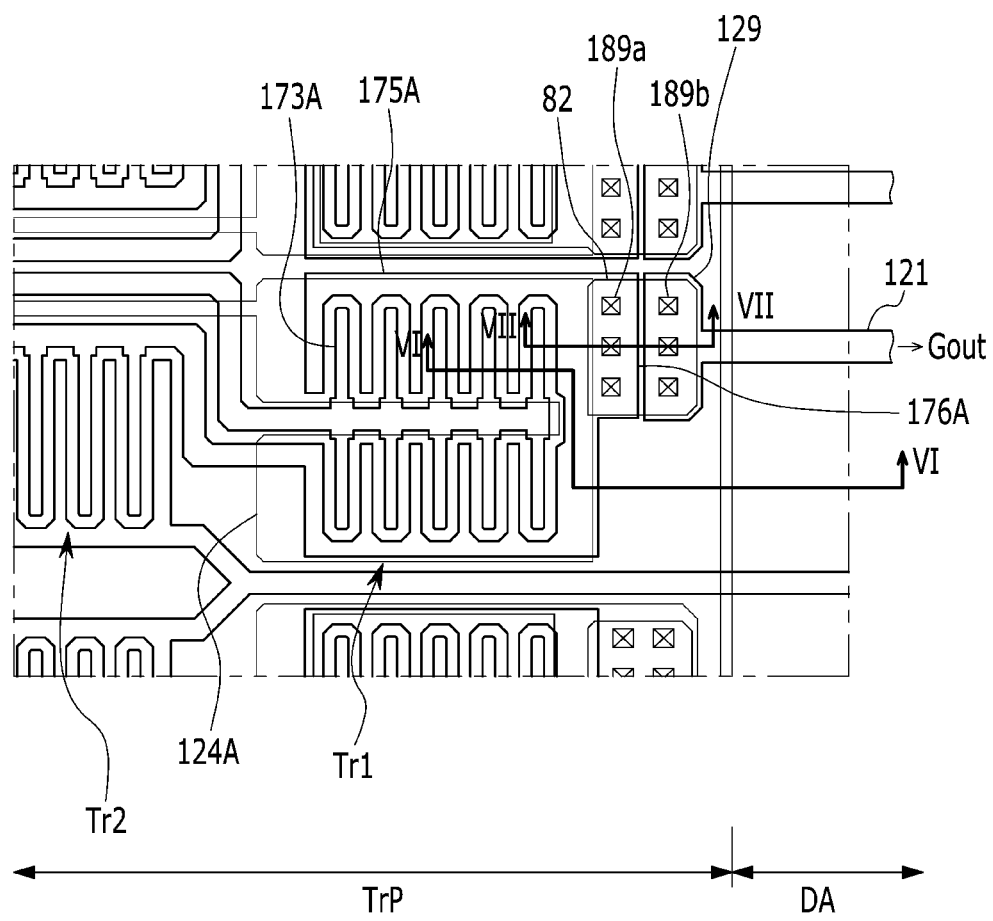
FIG. 4 is an enlarged top plan view of portion "A" of FIG. 3.
Figure 5:
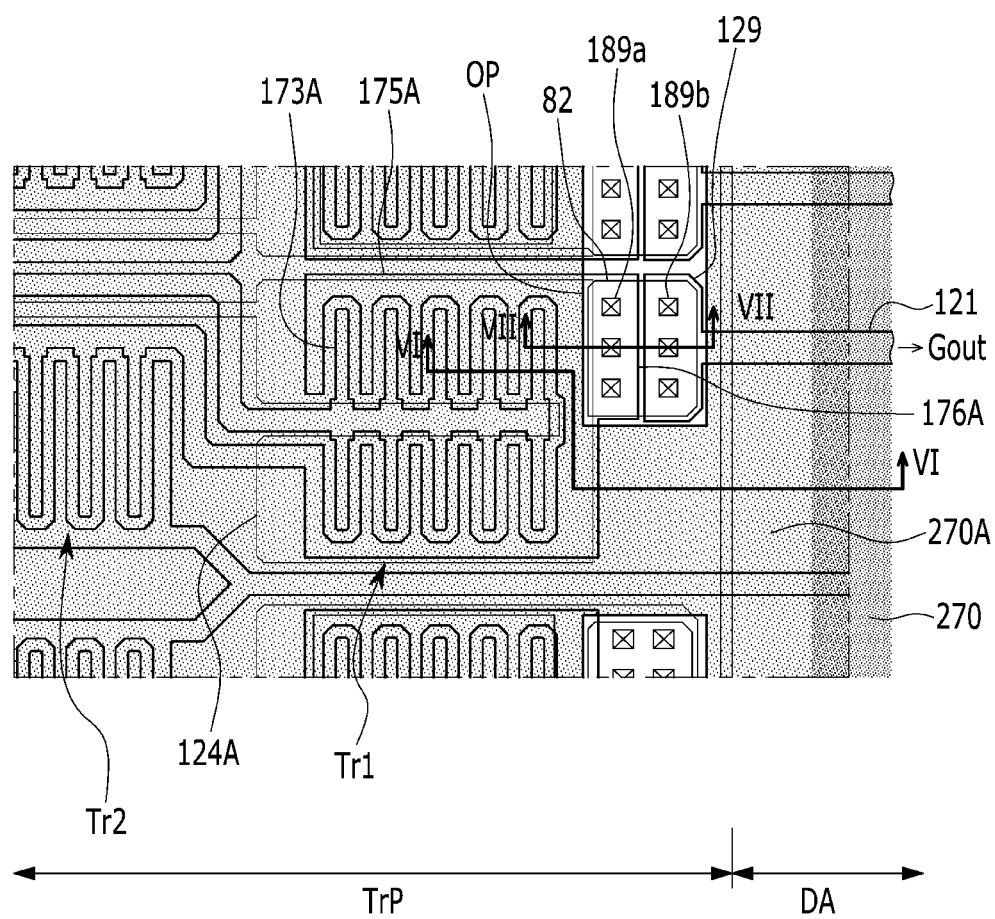
FIG. 5 is a top plan view of an exemplary embodiment of a common voltage application unit and a common electrode in the display device shown in FIG. 4.
Figure 6:
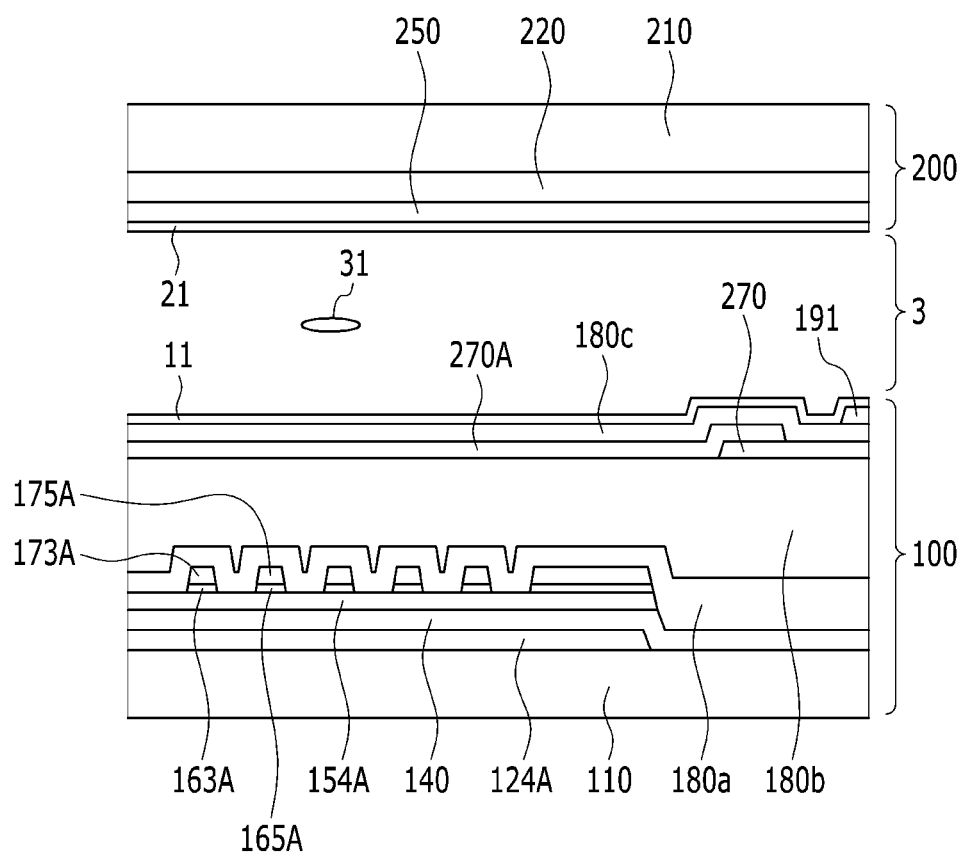
FIG. 6 is a cross-sectional view taken along line VI-VI of FIG. 5.
Figure 7:
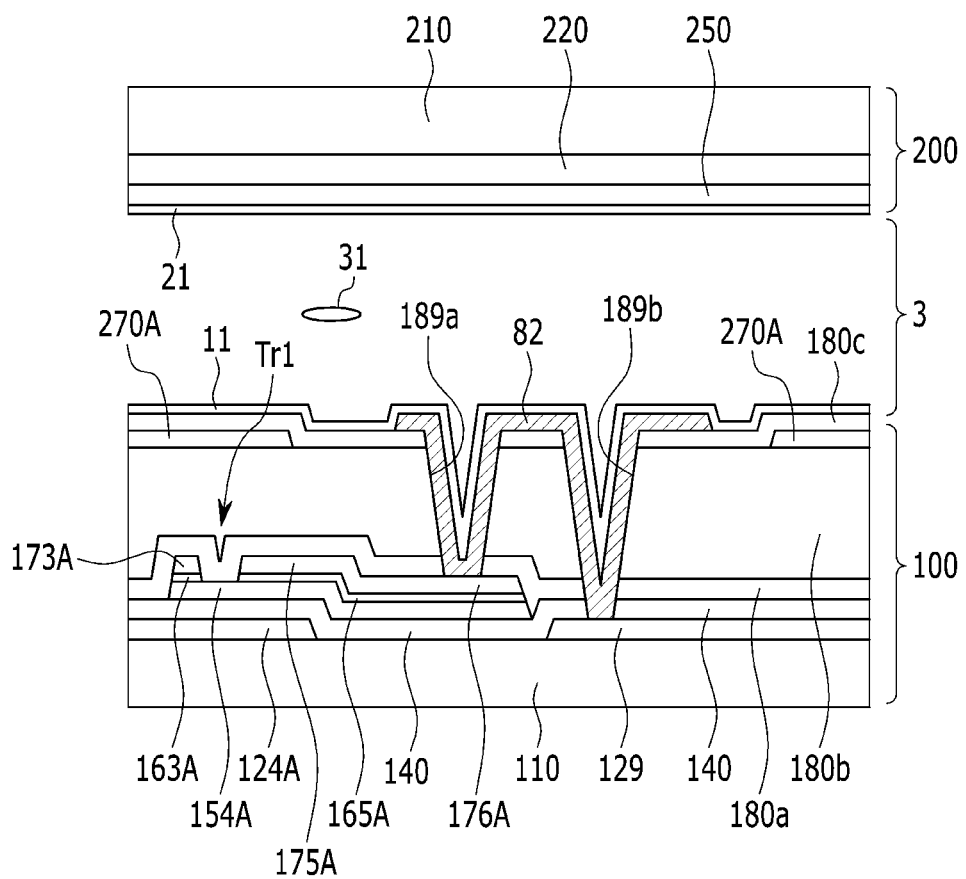
FIG. 7 is a cross-sectional view taken along line VII-VII of FIG. 5.

FIG. 3 is a schematic block diagram of an exemplary embodiment of a display device according the invention. FIG. 4 is an enlarged top plan view of portion "A" of FIG. 3. FIG. 5 is a top plan view of an exemplary embodiment of a common voltage application unit and a common electrode in the display device shown in FIG. 4. FIG. 6 is a cross-sectional view taken along line VI-VI of FIG. 5. FIG. 7 is a cross-sectional view taken along line VII-VII of FIG. 5.

Referring to FIG. 3, the gate driver 400 includes a transistor unit TrP including a plurality of transistors. The transistor unit TrP may include the layers defining the transistors, such as gate and data conductors, a semiconductor layer and/or various insulating layers. Herein, the transistor unit may otherwise be referred to as a transistor circuit unit.

Referring to FIG. 4 to FIG. 7, a gate conductor including a plurality of gate electrodes 124A is disposed on an insulation substrate 110.

The gate conductor may further include a plurality of gate lines 121. The gate line 121 may include an end 129 for connection to the gate driver 400, and the end 129 may have a larger planar area relative to that of the gate line 121 and/or the gate electrode 124A. The plurality of gate lines 121 are elongated and may extend from the display area DA and into the peripheral area PA.

Next, an exemplary embodiment of a pixel structure of the display device according to the invention will be described with reference to FIG. 8 and FIG. 9.

Figure 8:
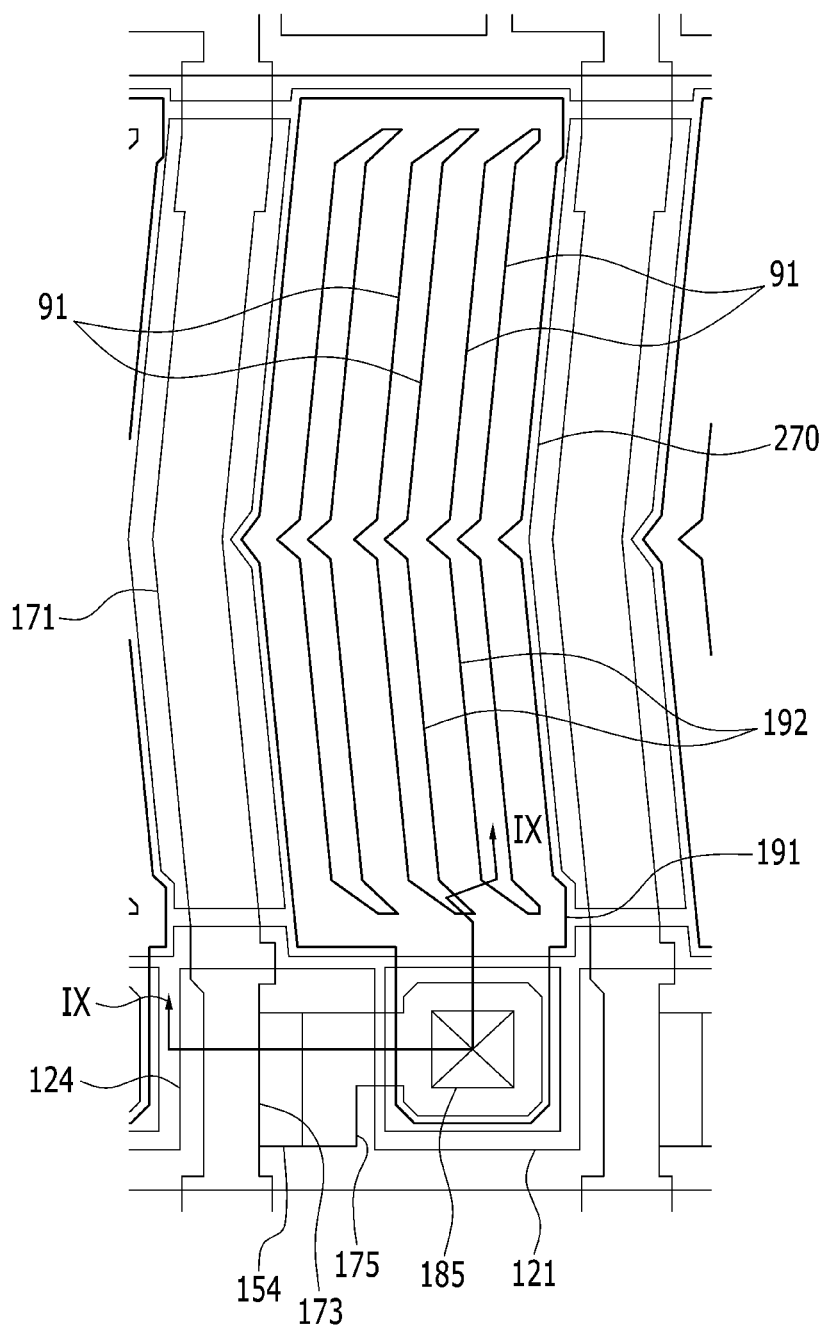
FIG. 8 is a top plan view of an exemplary embodiment of a liquid crystal display according to the invention.

FIG. 8 is a top plan view of an exemplary embodiment of a LCD according to the invention. FIG. 9 is a cross-sectional view taken along line IX-IX of FIG. 8.

Figure 9:
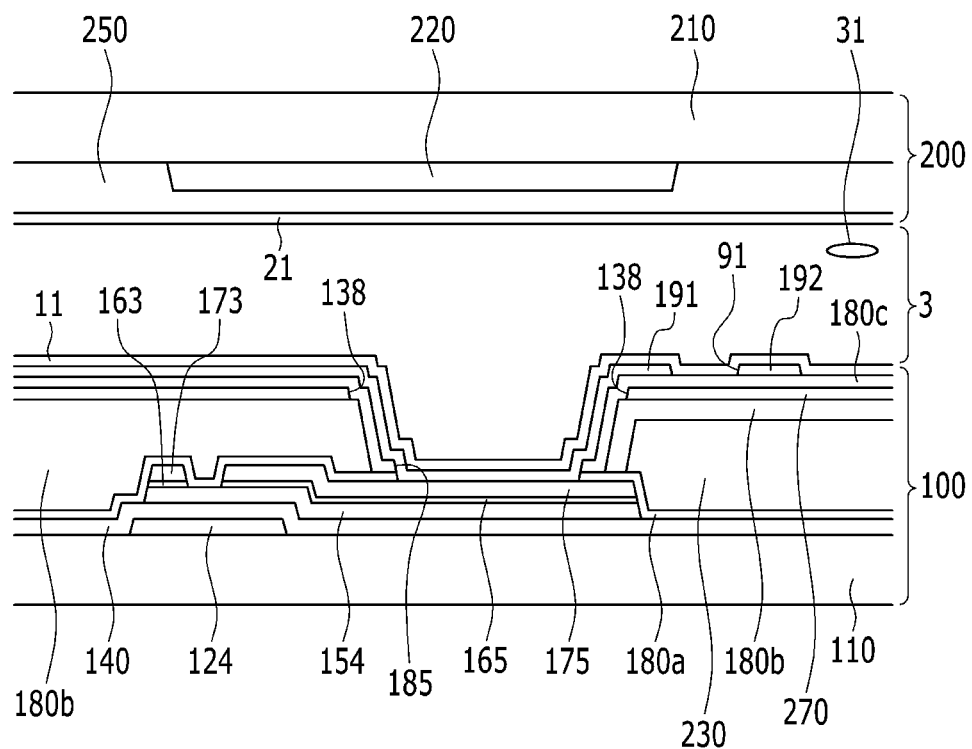
FIG. 9 is a cross-sectional view taken along line IX-IX of FIG. 8.

Referring to FIG. 8 and FIG. 9, a display device includes a lower panel 100 and an upper panel 200, and a liquid crystal layer 3 including liquid crystal molecules 31 injected therebetween.

Firstly, the lower panel 100 will be described.

A gate conductor including the gate line 121 is disposed on a first substrate 110 including transparent glass or plastic.

The gate line 121 transmits the gate signal and mainly extends in a horizontal direction in the top plan view. The gate line 121 includes a gate electrode 124.

The gate line 121 may include aluminum (Al) or an aluminum-based metal such as an aluminum alloy, silver (Ag) or a silver-based metal such as a silver alloy, copper (Cu) or a copper-based metal such as a copper alloy, molybdenum (Mo) or a molybdenum-based metal such as a molybdenum alloy, chromium (Cr), tantalum (Ta), or titanium (Ti). The gate line 121, however, may have a multilayer structure including at least two conductive layers having different physical properties.

A gate insulating layer 140 including silicon nitride (SiNx) or a silicon oxide (SiOx) is disposed on the gate line 121. The gate insulating layer 140 may have a multilayer structure including at least two insulating layers having different physical properties.

A semiconductor layer 154 including amorphous silicon or polysilicon is disposed on the gate insulating layer 140. The semiconductor layer 154 may include an oxide semiconductor.

Ohmic contacts 163 and 165 are disposed on the semiconductor layer 154. The ohmic contacts 163 and 165 may include a material such as n+ hydrogenated amorphous silicon in which an n-type impurity such as phosphorus is doped at a relatively high concentration, or a silicide. The ohmic contacts 163 and 165 may be disposed as a pair on the semiconductor layer 154, with respect to the gate electrode 124. When the semiconductor layer 154 is an oxide semiconductor, the ohmic contacts 163 and 165 may be omitted.

A data conductor including a data line 171 including a source electrode 173 and a drain electrode 175 is formed on the ohmic contacts 163 and 165 and the gate insulating layer 140.

The data line 171 transfers a data signal and extends mainly in a vertical direction in the top plan view to cross the gate line 121.

The data line 171 may be curved as having a curved or bent shape to obtain maximum transmittance of display device such as a LCD. First and second curved portions may meet each other at an intermediate region of the pixel area to form a V shape and define a curved portion of the data line 171.

A source electrode 173 corresponds to a part of the data line 171 and is disposed on the same line as the data line 171. A drain electrode 175 is disposed to extend in parallel to the source electrode 173 in the top plan view. Therefore, the drain electrode 175 is parallel to a part of the data line 171.

The gate electrode 124, the source electrode 173 and the drain electrode 175 form a thin film transistor ("TFT") together with the semiconductor 154, and a channel of the TFT is formed by the semiconductor 154 exposed between the source electrode 173 and the drain electrode 175.

The illustrated exemplary embodiment of the LCD according to the invention includes the source electrode 173 disposed on the same line as the data line 171 and the drain electrode 175 extending parallel to the data line 171 so that the width of the TFT may be widened without increasing an area of the data conductor, thereby increasing an aperture ratio of the LCD.

The data conductor may include a refractory metal such as molybdenum, chromium, tantalum and titanium, or an alloy thereof, and have a multilayer structure including a refractory metal layer (not illustrated) and a relatively low resistance conductive layer (not illustrated). Exemplary embodiments of the multilayer structure includes a double layer including a chromium or molybdenum (alloy) lower layer and an aluminum (alloy) upper layer, and a triple layer including a molybdenum (alloy) lower layer, an aluminum (alloy) intermediate layer and a molybdenum (alloy) upper layer.

A first passivation layer 180a is disposed on the data conductors 171, 173 and 175, the gate insulating layer 140, and the exposed portion of the semiconductor 154. The first passivation layer 180a may include an organic insulating material or an inorganic insulating material.

A color filter 230 may be disposed on the first passivation layer 180a. The color filter 230 may uniquely display one of a number of primary colors. Examples of the primary colors may include three primary colors such as red, green and blue and three primary colors such as yellow, cyan and magenta. Although not shown, the color filter 230 may further include a color filter element displaying a mixed color of the primary colors or white color, in addition to the primary colors. Each color filter 230 among a plurality of color filters 230 in the LCD, may be elongated along a pixel column or a pixel row. The color filter 230 may be disposed in the upper panel 200, but the invention is not limited thereto.

A second passivation layer 180b is disposed on the color filter 230. The second passivation layer 180b may include the inorganic insulating material or the organic insulating material. The second passivation layer 180b as an overcoat for the color filter 230 reduces or effectively prevents exposure of the color filter 230 such that flowing of an impurity such as a pigment of the color filter 230 into the liquid crystal layer 3 may be reduced or effectively prevented, and may provide a flat surface.

When the second passivation layer 180b includes the organic insulating material, a cross-sectional thickness of the second passivation layer 180b is more than about 1.0 micrometer (μm), in detail, about 2.0 μm, but is not limited thereto. Also, a dielectric ratio the second passivation layer 180b is less than about 10, in detail, about 3.3, but is not limited thereto.

A common electrode 270 is disposed on the second passivation layer 180b. The common electrode 270 has a planar shape in the top plan view, and may be disposed on substantially the entire first substrate 110 as a plate. An opening 138 may be defined in the common electrode 270 in region corresponding to the periphery of the drain electrode 175. That is, the common electrode 270 may have the planar plate shape without further openings or slits defined therein.

Common electrodes 270 disposed in adjacent pixels are connected to each other to receive a common voltage of a predetermined level supplied from outside of the display area DA. The common electrode 270 of each pixel PX may have a planar shape. The common electrode 270 may be include a transparent conductive material such as indium tin oxide ("ITO") or indium zinc oxide ("IZO"), or a conductive material such as a metal.

A third passivation layer 180c is disposed on the common electrode 270. The third passivation layer 180c may include the organic insulating material or the inorganic insulating material.

The pixel electrode 191 is disposed on the third passivation layer 180c. The pixel electrode 191 includes a curved edge which is substantially parallel to the first curved portion and the second curved portion of the data line 171. A plurality of cutouts 91 is defined in the pixel electrode 191, and a plurality of branch electrodes 192 disposed between the adjacent cutouts 91. The pixel electrode 191 may include the transparent conductive material such as ITO or IZO, or the conductive material such as the metal.

A contact hole 185 is defined in the first passivation layer 180a, the second passivation layer 180b and the third passivation layer 180c and exposes the drain electrode 175. The pixel electrode 191 is physically and electrically connected to the drain electrode 175 through the contact hole 185 to receive a voltage from the drain electrode 175. As used herein, the second passivation layer 180b may be indicated as a first insulating layer, and the third passivation layer 180c may be indicated as a second insulating layer.

A first alignment layer 11 is disposed on the pixel electrode 191 and the third passivation layer 180c. The first alignment layer 11 may include a photo-alignment material, which is a vertical alignment material.

Now, the upper panel 200 will be described.

A light blocking member 220 is disposed on a second substrate 210 including transparent glass, plastic, or the like. The first and second substrates 110 and 210 may be insulating substrate. The light blocking member 220 is otherwise referred to as a black matrix and prevents light leakage. In alternative exemplary embodiment, the light blocking member 220 illustrated in the upper panel 200, may be disposed in the lower panel 100 instead of the upper panel 200.

An overcoat 250 is disposed on the light blocking member 220. The overcoat 250 may include an (organic) insulating material. In an exemplary embodiment, the overcoat 250 may be omitted.

A second alignment layer 21 is disposed on the overcoat 250. The second alignment layer 21 may include the same material, and be formed by a same method as the first alignment layer 11 in a method of manufacturing the LCD.

The pixel electrode 191 receives the data voltage from the drain electrode 175, and the common electrode 270 receives a common voltage of a predetermined magnitude from a common voltage application unit disposed at the peripheral area PA.

The pixel electrode 191 and the common electrode 270 as field generating electrodes generate an electrical field such that the liquid crystal molecules 31 of the liquid crystal layer 3 disposed therebetween are rotated in a direction substantially parallel to the direction of the electric field. As described above, according to the determined rotation direction of the liquid crystal molecules 31, the polarization of light passing through the liquid crystal layer 3 is changed.

As described above, by forming the two field generating electrodes 191 and 270 in one display panel 100, transmittance of the LCD is increased and a wide viewing angle thereof may be realized.

According to the LCD of the illustrated exemplary embodiment, the common electrode 270 has the planar shape and the pixel electrode 191 has a plurality of branch electrodes 192, however, according to another exemplary embodiment of a LCD according to the invention, the pixel electrode 191 may have a planar shape and the common electrode 270 may have a plurality of branch electrodes.

The invention is applicable to various display devices in which two field generating electrodes overlap via an insulating layer on a single first substrate, the first field generating electrode disposed under the insulating layer has the plane shape, and the second field generating electrode disposed above the insulating layer has a plurality of branch electrodes.

Next, an exemplary embodiment of a structure of the gate driver of the display device according to the invention will be described referring again to FIG. 3 to FIG. 8 as well as the described drawings.

Referring to FIG. 3 to FIG. 7, in the transistor unit TrP, the gate insulating layer 140 is disposed on the gate conductor. The gate conductor and gate insulating layer 140 may be in the transistor unit TrP is in a same layer as the gate conductor and the gate insulating layer 140 in the display area DA, respectively.

A semiconductor layer 154A is disposed on the gate insulating layer 140. The semiconductor layer 154A may include amorphous silicon, polysilicon, or an oxide semiconductor. The semiconductor layer 154A in the transistor unit TrP may be in a same layer as the semiconductor layer 154 in the display area DA.

Ohmic contacts 163A and 165A may be disposed on the semiconductor layer 154A. In an exemplary embodiment, the ohmic contacts 163A and 165A may be omitted. The ohmic contacts 163A and 165A in the transistor unit TrP may be in a same layer as the ohmic contacts 163 and in the display area DA.

The data conductor including a source electrode 173A and a drain electrode 175A is disposed on the ohmic contacts 163A and 165A and the gate insulating layer 140. The data conductor in the transistor unit TrP may be in the same layer as the data conductor in the display area DA.

The source electrode 173A may be input with a clock signal.

The drain electrode 175A may include a protrusion 176A for connection with other layer of the display device. The drain electrode 175A may be connected to a second switching element such as a second TFT Tr2.

Switching elements and/or thin film transistors may otherwise be referred to as a transistor.

The gate electrode 124A, the source electrode 173A and the drain electrode 175A form a first transistor Tr1 along with the semiconductor layer 154A. The gate electrode 124A forms a control terminal of the first transistor Tr1, the source electrode 173A forms an input terminal of the first transistor Tr1, and the drain electrode 175A forms an output terminal of the first transistor Tr1. The channel of the first transistor Tr1 is formed in the semiconductor layer 154A exposed between the source electrode 173A and the drain electrode 175A.

The first passivation layer 180a is disposed on the data conductor, and the second passivation layer 180b is disposed on the first passivation layer 180a. The second passivation layer 180b may include the inorganic insulating material or the organic insulating material, as described above. When including the organic insulating material, the cross-sectional thickness of the second passivation layer 180b may be more than about 1.0 μm, in detail, about 2.0 μm, but is not limited thereto. Also, the dielectric ratio of the second passivation layer 180b may be less than about 10, in detail, about 3.3, but is not limited thereto. According to an exemplary embodiment of the invention, to reduce or effectively prevent an increase of a parasitic capacitance between a common voltage application unit or member 270A that will be described later and the transistor unit TrP, the second passivation layer 180*b* includes a relatively thick organic layer.

As shown in FIG. 5 and FIG. 6, the common voltage application unit 270A is disposed on the second passivation layer 180*b*. In an exemplary embodiment, the common voltage application unit 270A according to the invention may be at an upper portion of the transistor unit TrP disposed at the peripheral area PA, in a cross-sectional view. The common voltage application unit 270A may include aluminum (Al) or an aluminum-based metal such as an aluminum alloy, silver (Ag) or a silver-based metal such as a silver alloy, copper (Cu) or a copper-based metal such as a copper alloy, molybdenum (Mo) or a molybdenum-based metal such as a molybdenum alloy, chromium (Cr), tantalum (Ta), or titanium (Ti).

In the illustrated exemplary embodiment, the common voltage application unit 270A according to the invention may overlap the transistor unit TrP and an opening OP may be is defined in the common voltage application unit 270A at a portion where a contact assistant 82 is disposed and is described later in FIG. 7.

In the conventional art, a common voltage application unit is in the same layer as the source electrode or the drain electrode such that a region occupied by the common voltage application unit is separately required in the peripheral area PA.

However, in the exemplary embodiment according to the invention, the common voltage application unit 270A is disposed at the upper portion of the transistor unit TrP including the source electrode 173A and the drain electrode 175A, in the cross-sectional view, such that a width of the peripheral area PA (and a bezel of the display device) may be reduced. Also, the common voltage application unit 270A is disposed on the second passivation layer 180*b* such that a line width of the common voltage application unit 270A may be expanded, thereby reducing the electrical resistance of the signal line. Additionally, the second passivation layer 180*b* is disposed between the common voltage application unit 270A and the transistor unit TrP such that the parasitic capacitance may be reduced.

In the exemplary embodiment according to the invention, the common voltage application unit 270A overlapping the transistor unit TrP in the peripheral area PA is connected to the common electrode 270 at the peripheral area PA adjacent to the display area DA. The common electrode 270 and the common voltage application unit 270A may be connected directly, as shown in FIG. 6, but the invention is not limited thereto. In the exemplary embodiment, the common voltage application unit 270A includes the metal material such as copper such that in an exemplary embodiment of a method of manufacturing the display device, the common voltage application unit 270A may be formed by using a mask that is separate from the common electrode 270. However, in an alternative exemplary embodiment, the common voltage application unit 270A may be formed of the same material as the common electrode 270, and may be simultaneously formed in a method of manufacturing the display device.

As shown in FIG. 6, one end of the common voltage application unit 270A may have a shape such that the common voltage application unit 270A overlaps (e.g., above) the underlying common electrode 270. However, in an alternative exemplary embodiment, the common electrode 270 may have a shape which overlaps the underlying common voltage application unit 270A.

The third passivation layer 180*c* is disposed on the common voltage application unit 270A and the second passivation layer 180*b*. The third passivation layer 180*c* may include the inorganic insulating material or the organic insulating material. The first, second and third passivation layers 180*a*, 180*b* and 180*c* in the transistor unit TrP may be in same layers as the first, second and third passivation layers 180*a*, 180*b* and 180*c* in the display area DA, respectively.

As shown in FIG. 7, one or more of a first contact hole 189*a* may be defined in the first passivation layer 180*a*, the second passivation layer 180*b* and the third passivation layer 180*c* and expose the protrusion 176A of the drain electrode 175A. One or more of a second contact hole 189*b* may be defined in the gate insulating layer 140, the first passivation layer 180*a*, the second passivation layer 180*b* and the third passivation layer 180*c* and expose the end 129 of the gate line 121.

The contact assistant 82 may be disposed on the third passivation layer 180*c*. The contact assistant 82 electrically connects the end 129 of the gate line 121 and the output terminal 175A of the first transistor Tr1 through the first contact hole 189*a* and the second contact hole 189*b*. The contact assistant 82 may be disposed in the same layer as the pixel electrode 191 disposed in the display area DA.

The first transistor Tr1 may output a gate signal Gout to the gate line 121 in the display area DA, connected to the drain electrode 175A in the peripheral area PA.

In the illustrated exemplary embodiment, the light blocking member 220 is disposed in the upper panel 200, but is not limited thereto. In an alternative exemplary embodiment, the light blocking member 220 may be disposed in the lower panel 100.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A display device comprising:
   a display panel comprising a substrate on which a display area in which a pixel is disposed is defined, and a non-display peripheral area adjacent to the display area is defined;
   a common electrode in the display area;
   a gate driver integrally formed in the peripheral area of the substrate and comprising:
      a common voltage application unit in the peripheral area and which provides a common voltage to the common electrode in the display area;
      a transistor unit which is on the substrate in the peripheral area; and
      a first insulating layer between the common voltage application unit and the transistor unit,
   wherein
   in the peripheral area, the common voltage application unit overlaps the transistor unit, via the first insulating layer therebetween,
   the common voltage application unit extends from the gate driver to define a common voltage application unit portion which overlaps the common electrode in the display area, and
   the common voltage application unit portion is disposed on the first insulating layer.

2. The display device of claim 1,
   wherein the common electrode and the common voltage application unit portion are connected to each other.

3. The display device of claim 2, wherein
the common electrode and the common voltage application unit portion are directly connected to each other.
4. The display device of claim 3, wherein
the common electrode and the common voltage application unit comprise different materials.
5. The display device of claim 4, wherein
an edge of the common voltage application unit portion overlaps the common electrode.
6. The display device of claim 5, further comprising
a contact assistant on the first insulating layer, and
an opening defined in the common voltage application unit and exposing the contact assistant.
7. The display device of claim 4, wherein:
the pixel comprises a switching element, a pixel electrode connected to the switching element, and the common electrode which transmits the common voltage;
the pixel electrode and the common electrode are on the first insulating layer;
a second insulating layer between the pixel electrode and the common electrode, and
the pixel electrode and the common electrode overlap each other via the second insulating layer therebetween.
8. The display device of claim 7, further comprising
a contact assistant on the second insulating layer,
wherein
the transistor unit comprises two transistors,
each transistor comprises a gate electrode, a source electrode and a drain electrode, and the drain electrode is connected to the contact assistant.
9. The display device of claim 8, wherein
a first contact hole is defined in the first insulating layer and exposes the drain electrode, and
the drain electrode is connected to the contact assistant through the first contact hole.
10. The display device of claim 9, further comprising
a gate line which transmits a gate signal to the pixel,
a second contact hole defined in the first insulating layer and exposing an end of the gate line, and
the contact assistant is connected to the end of the gate line through the second contact hole.
11. The display device of claim 4, wherein
the common electrode comprises a metal material, and
the common voltage application unit comprises a transparent conductive material.

12. The display device of claim 2, wherein
the first insulating layer comprises an organic material.
13. The display device of claim 2, further comprising
a contact assistant on the first insulating layer, and
an opening defined in the common voltage application unit and exposing the contact assistant.
14. The display device of claim 13, wherein:
the pixel comprises a switching element, a pixel electrode connected to the switching element, and the common electrode which transmits the common voltage;
the pixel electrode and the common electrode are on the first insulating layer;
a second insulating layer between the pixel electrode and the common electrode; and
the pixel electrode and the common electrode overlap each other via the second insulating layer therebetween.
15. The display device of claim 14, wherein
the transistor unit comprises two transistors,
each transistor comprises a gate electrode, a source electrode and a drain electrode, and
the drain electrode is connected to the contact assistant.
16. The display device of claim 15, wherein
a first contact hole is defined in the first insulating layer and exposes the drain electrode, and
the drain electrode is connected to the contact assistant through the first contact hole.
17. The display device of claim 16, further comprising
a gate line which transmits a gate signal to the pixel,
a second contact hole defined in the first insulating layer and exposing an end of the gate line, and
the contact assistant is connected to the end of the gate line through the second contact hole.
18. The display device of claim 2, wherein
the common electrode comprises a metal material, and
the common voltage application unit comprises a transparent conductive material.
19. The display device of claim 18, wherein
the common electrode and the common voltage application unit portion are directly connected to each other.
20. The display device of claim 19, wherein
an edge of the common voltage application unit portion overlaps the common electrode.

* * * * *